US010117198B2

(12) United States Patent
Shan (10) Patent No.: US 10,117,198 B2
(45) Date of Patent: Oct. 30, 2018

(54) TERMINAL AND TERMINAL SYNCHRONIZATION METHOD (71) Applicant: Huawei Technologies Co., Ltd., Shenzhen (CN)

(72) Inventor: Zhenwei Shan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 15/207,166

(22) Filed: Jul. 11, 2016

(65) Prior Publication Data

US 2017/0026921 A1 Jan. 26, 2017

(30) Foreign Application Priority Data

Jul. 21, 2015 (CN) .......................... 2015 1 0431966

(51) Int. Cl.
*H04W 56/00* (2009.01)
*H04W 4/14* (2009.01)
*H04L 29/08* (2006.01)
*H04W 76/14* (2018.01)

(52) U.S. Cl.
CPC ....... *H04W 56/001* (2013.01); *H04L 67/1095* (2013.01); *H04L 67/26* (2013.01); *H04L 67/306* (2013.01); *H04W 4/14* (2013.01); *H04W 76/14* (2018.02)

(58) Field of Classification Search
CPC .................................................. H04W 56/001
See application file for complete search history.

(56) References Cited

U.S. PATENT DOCUMENTS

| 7,890,646 | B2 | 2/2011 | Khosravy et al. |
| 8,140,954 | B2* | 3/2012 | Carro ................. H04N 21/4113 |
| | | | 348/722 |
| 8,577,353 | B2* | 11/2013 | Tysowski ............... H04L 51/14 |
| | | | 455/412.1 |
| 9,602,858 | B1* | 3/2017 | Kaiser ................ H04N 21/4307 |

(Continued)

FOREIGN PATENT DOCUMENTS

CN 103970208 A 8/2014

OTHER PUBLICATIONS

"Adding Wearable Features to Notifications," https://developer.android.com/training/wearables/notifications/index.html, Jun. 25, 2015, 2 pages.

*Primary Examiner* — Edan Orgad
*Assistant Examiner* — Emmanuel K Maglo
(74) *Attorney, Agent, or Firm* — Conley Rose, P.C.

(57) ABSTRACT

A terminal and a terminal synchronization method. A first terminal automatically acquires at least one of common data or personalized data of the first terminal according to at least one of capability information or type information of a connected second terminal and sends at least one of the common data or the personalized data to the second terminal that belongs to a same account as the first terminal or sends only the common data to the second terminal that belongs to a different account. In an entire synchronization process, a user does not need to manually perform setting, which simplifies an operation; in addition, for the different account, only the common data is synchronized and the personalized data is not synchronized, which keeps usage preferences of different users unchanged and improves user experience.

18 Claims, 3 Drawing Sheets (56) References Cited

U.S. PATENT DOCUMENTS

| | | | |
|---|---|---|---|
| 2010/0174912 A1* | 7/2010 | West | G06F 17/30575 |
| | | | 713/183 |
| 2010/0287219 A1* | 11/2010 | Caso | G06F 17/30094 |
| | | | 707/827 |
| 2013/0064336 A1 | 3/2013 | Schadt et al. | |
| 2013/0088192 A1* | 4/2013 | Eaton | G06F 1/266 |
| | | | 320/108 |
| 2013/0132464 A1* | 5/2013 | Dowling | H04L 67/42 |
| | | | 709/203 |
| 2013/0297604 A1* | 11/2013 | Sutedja | G06Q 10/107 |
| | | | 707/737 |
| 2014/0040769 A1* | 2/2014 | Lazaridis | G06F 3/0483 |
| | | | 715/752 |
| 2014/0359051 A1* | 12/2014 | Dart | G06F 11/1451 |
| | | | 709/216 |
| 2015/0058287 A1* | 2/2015 | Zhang | G06F 17/30575 |
| | | | 707/610 |

\* cited by examiner

FIG. 4

TERMINAL AND TERMINAL SYNCHRONIZATION METHOD

CROSS-REFERENCE TO RELATED APPLICATIONS

This application claims priority to Chinese patent application number 201510431966.5 filed on Jul. 21, 2015, which is hereby by reference.

TECHNICAL FIELD

The present disclosure relates to the field of communications technologies, and more specifically, to a terminal and a terminal synchronization method.

BACKGROUND

With development of communications terminal technologies, data synchronization between a wearable device and a smart phone becomes increasingly popular. The data synchronization refers to that the wearable device may be automatically updated with same or matched data after the smart phone updates data of an agreed synchronization event.

In an existing data synchronization solution, a user needs to manually pre-select a to-be-synchronized option, and after the wearable device is replaced, for example, a smart watch that is synchronized with the smart phone is replaced with a pair of smart glasses, the user still needs to manually perform resetting on the smart phone and the pair of smart glasses, which greatly affects user experience because of a cumbersome operation. In addition, in the existing data synchronization solution, only a notification message such as an incoming call notification message can be synchronized, and a personalized setting cannot be synchronized. For example, when settings such as an alarm clock and a profile that are of the smart phone need to be synchronized to the wearable device, the user needs to directly and manually perform setting on the wearable device.

SUMMARY

In view of this, embodiments of the present disclosure provide a terminal and a terminal synchronization method, which can automatically synchronize common data or personalized data of two terminals.

Technical solutions adopted in the embodiments of the present disclosure are as follows:

According to a first aspect, a terminal synchronization method is provided, including: establishing a connection between a first terminal and a second terminal; acquiring attribute information of the first terminal and attribute information of the second terminal, where the attribute information includes first attribute information and second attribute information, the first attribute information includes at least one of account information or status information, and the second attribute information includes at least one of capability information or type information; determining, according to at least one of first attribute information of the first terminal or first attribute information of the second terminal, whether the first terminal and the second terminal belong to a same account; and if the first terminal and the second terminal belong to the same account, acquiring first synchronization data of the first terminal according to the second attribute information of the first terminal and the second attribute information of the second terminal, where the first synchronization data is at least one of common data or personalized data, and synchronizing, by the first terminal, the first synchronization data of the first terminal to the second terminal; or if the first terminal and the second terminal belong to different accounts, acquiring second synchronization data of the first terminal according to the second attribute information of the first terminal and the second attribute information of the second terminal, where the second synchronization data includes only common data, and synchronizing, by the first terminal, the second synchronization data of the first terminal to the second terminal.

With reference to the first aspect, in a first possible implementation manner, the determining, according to at least one of first attribute information of first terminal or the first attribute information of the second terminal, whether the first terminal and the second terminal belong to a same account includes: determining, according to at least one of status information of the first terminal or status information of the second terminal, duration for establishing the connection between the first terminal and the second terminal; and if the duration is greater than or equal to a preset threshold, determining that the first terminal and the second terminal belong to the same account; or if the duration is less than a preset threshold, determining that the first terminal and the second terminal belong to different accounts.

With reference to the first aspect, in a second possible implementation manner, the determining, according to at least one of first attribute information of the first terminal or first attribute information of the second terminal, whether the first terminal and the second terminal belong to a same account includes: determining whether account information of the first terminal is the same as account information of the second terminal; and if the account information of the first terminal is the same as the account information of the second terminal, determining that the first terminal and the second terminal belong to the same account; or if the account information of the first terminal is different from the account information of the second terminal, determining that the first terminal and the second terminal belong to different accounts.

With reference to the first or the second possible implementation manner of the first aspect, in a third possible implementation manner, the acquiring first synchronization data of the first terminal according to the second attribute information of the first terminal and the second attribute information of the second terminal includes: determining whether the second attribute information of the first terminal matches the second attribute information of the second terminal; and if the second attribute information of the first terminal matches the second attribute information of the second terminal, acquiring common data that is of the first terminal and that is corresponding to the second attribute information of the second terminal and personalized data that is of the first terminal and that is corresponding to the second attribute information of the second terminal; or if the second attribute information of the first terminal does not match the second attribute information of the second terminal, acquiring only common data that is of the first terminal and that is corresponding to the second attribute information of the second terminal.

With reference to the first aspect, in a fourth possible implementation manner, the synchronizing, by the first terminal, the first synchronization data of the first terminal to the second terminal includes: determining, according to status information of the first terminal, whether the first terminal is being charged; and if the first terminal is being charged, synchronizing, by the first terminal, the first synchronization data of the first terminal to the second terminal, and executing, by the second terminal instead of the first terminal, an operation corresponding to the common data of the first terminal; or if the first terminal is not being charged, synchronizing, by the first terminal, the first synchronization data of the first terminal to the second terminal, and executing, by at least one of the first terminal or the second terminal, an operation corresponding to the common data of the first terminal.

With reference to the first aspect, in a fifth possible implementation manner, the synchronizing, by the first terminal, the first synchronization data of the first terminal to the second terminal includes: determining, according to status information of the first terminal, whether a current battery level of the first terminal is less than a preset threshold; and if the current battery level of the first terminal is less than the preset threshold, synchronizing, by the first terminal, the first synchronization data of the first terminal to the second terminal, and executing, by the second terminal instead of the first terminal, an operation corresponding to the common data of the first terminal; or if the current battery level of the first terminal is not less than the preset threshold, synchronizing, by the first terminal, the first synchronization data of the first terminal to the second terminal, and executing, by at least one of the first terminal or the second terminal, an operation corresponding to the common data of the first terminal.

According to a second aspect, a terminal synchronization method is provided, including: establishing a connection between a first terminal and a second terminal; acquiring at least one of attribute information of the first terminal or attribute information of the second terminal, where the attribute information includes first attribute information and second attribute information, the first attribute information includes at least one of account information or status information, and the second attribute information includes at least one of capability information or type information; determining whether the second attribute information of the first terminal matches the second attribute information of the second terminal; and if the second attribute information of the first terminal matches the second attribute information of the second terminal, determining, according to at least one of first attribute information of the first terminal or first attribute information of the second terminal, whether the first terminal and the second terminal belong to a same account; and if the first terminal and the second terminal belong to the same account, acquiring first synchronization data of the first terminal according to the second attribute information of the first terminal and the second attribute information of the second terminal, where the first synchronization data is at least one of common data or personalized data, and synchronizing, by the first terminal, the first synchronization data to the second terminal; or if the first terminal and the second terminal belong to different accounts, acquiring second synchronization data of the first terminal according to the second attribute information of the first terminal and the second attribute information of the second terminal, where the second synchronization data includes only common data, and synchronizing, by the first terminal, the second synchronization data to the second terminal; or if the second attribute information of the first terminal does not match the second attribute information of the second terminal, acquiring second synchronization data of the first terminal according to the second attribute information of the first terminal and the second attribute information of the second terminal, and synchronizing, by the first terminal, the second synchronization data to the second terminal.

With reference to the second aspect, in a first possible implementation manner, the determining, according to at least one of first attribute information of the first terminal or first attribute information of the second terminal, whether the first terminal and the second terminal belong to a same account includes: determining, according to at least one of status information of the first terminal or status information of the second terminal, duration for establishing the connection between the first terminal and the second terminal; and if the duration is greater than or equal to a preset threshold, determining that the first terminal and the second terminal belong to the same account; or if the duration is less than a preset threshold, determining that the first terminal and the second terminal belong to different accounts.

With reference to the second aspect, in a second possible implementation manner, the determining, according to at least one of first attribute information of the first terminal or first attribute information of the second terminal, whether the first terminal and the second terminal belong to a same account includes: determining whether account information of the first terminal is the same as account information of the second terminal; and if the account information of the first terminal is the same as the account information of the second terminal, determining that the first terminal and the second terminal belong to the same account; or if the account information of the first terminal is different from the account information of the second terminal, determining that the first terminal and the second terminal belong to different accounts.

With reference to the second aspect, in a third possible implementation manner, the synchronizing, by the first terminal, the first synchronization data of the first terminal to the second terminal includes: determining, according to status information of the first terminal, whether the first terminal is being charged; and if the first terminal is being charged, synchronizing, by the first terminal, the first synchronization data of the first terminal to the second terminal, and executing, by the second terminal instead of the first terminal, an operation corresponding to the common data of the first terminal; or if the first terminal is not being charged, synchronizing, by the first terminal, the first synchronization data of the first terminal to the second terminal, and executing, by at least one of the first terminal or the second terminal, an operation corresponding to the common data of the first terminal.

With reference to the second aspect, in a fourth possible implementation manner, the synchronizing, by the first terminal, the first synchronization data of the first terminal to the second terminal includes: determining, according to status information of the first terminal, whether a current battery level of the first terminal is less than a preset threshold; and if the current battery level of the first terminal is less than the preset threshold, synchronizing, by the first terminal, the first synchronization data of the first terminal to the second terminal, and executing, by the second terminal instead of the first terminal, an operation corresponding to the common data of the first terminal; or if the current battery level of the first terminal is not less than the preset threshold, synchronizing, by the first terminal, the first synchronization data of the first terminal to the second terminal, and executing, by at least one of the first terminal or the second terminal, an operation corresponding to the common data of the first terminal.

According to a third aspect, a terminal is provided, including: a communications module configured to establish a connection between the terminal and another terminal; an acquiring module configured to acquire attribute information of the terminal and attribute information of the another terminal after the connection between the terminal and the another terminal is established, where the attribute information includes first attribute information and second attribute information, the first attribute information includes at least one of account information or status information, and the second attribute information includes at least one of capability information or type information; and a processing module configured to determine, according to at least one of the first attribute information of the terminal or the first attribute information of the another terminal, whether the terminal and the another terminal belong to a same account; where if the terminal and the another terminal belong to the same account, the processing module is further configured to control the acquiring module to acquire first synchronization data of the terminal according to the second attribute information of the terminal and the second attribute information of the another terminal, where the first synchronization data is at least one of common data or personalized data; and the processing module controls the communications module to send the first synchronization data of the terminal to the another terminal, so that the terminal synchronizes the first synchronization data of the another terminal to the another terminal; or if the terminal and the another terminal belong to different accounts, the processing module is configured to control the acquiring module to acquire second synchronization data of the terminal according to the second attribute information of the terminal and the second attribute information of the another terminal, where the second synchronization data includes only common data; and the processing module controls the communications module to send the second synchronization data of the terminal to the another terminal, so that the terminal synchronizes the second synchronization data of the another terminal to the another terminal.

With reference to the third aspect, in a first possible implementation manner, the processing module is configured to determine, according to at least one of status information of the terminal or status information of the another terminal, duration for establishing the connection between the terminal and the another terminal; and if the duration is greater than or equal to a preset threshold, the processing module determines that the terminal and the another terminal belong to the same account; or if the duration is less than a preset threshold, the processing module determines that the terminal and the another terminal belong to different accounts.

With reference to the third aspect, in a second possible implementation manner, the processing module is configured to determine whether account information of the terminal is the same as account information of the another terminal; and if the account information of the terminal is the same as the account information of the another terminal, the processing module determines that the terminal and the another terminal belong to the same account; or if the account information of the terminal is different from the account information of the another terminal, the processing module determines that the terminal and the another terminal belong to different accounts.

With reference to the first or the second possible implementation manner of the third aspect, in a third possible implementation manner, the processing module is further configured to determine whether the second attribute information of the terminal matches the second attribute information of the another terminal; and if the second attribute information of the terminal matches the second attribute information of the another terminal, the processing module controls the acquiring module to acquire common data that is of a first terminal and that is corresponding to the second attribute information of the another terminal and personalized data that is of the first terminal and that is corresponding to the second attribute information of the another terminal; or if the second attribute information of the terminal does not match the second attribute information of the another terminal, the processing module controls the acquiring module to acquire only common data that is of a first terminal and that is corresponding to the second attribute information of the another terminal.

With reference to the third aspect, in a fourth possible implementation manner, the processing module is further configured to determine, according to status information of the terminal, whether the terminal is being charged; and if the terminal is being charged, the processing module controls the communications module to send the first synchronization data of the terminal to the another terminal, so that the terminal synchronizes the first synchronization data of the terminal to the another terminal and the another terminal instead of the terminal executes an operation corresponding to the common data of the terminal; or if the terminal is not being charged, the processing module controls the communications module to send the first synchronization data of the terminal to the another terminal, so that the terminal synchronizes the first synchronization data of the terminal to the another terminal and at least one of the terminal or the another terminal executes an operation corresponding to the common data of the terminal.

With reference to the third aspect, in a fifth possible implementation manner, the processing module is further configured to determine, according to status information of the terminal, whether a current battery level of the terminal is less than a preset threshold; and if the current battery level of the terminal is less than the preset threshold, the processing module controls the communications module to send the first synchronization data of the terminal to the another terminal, so that the terminal synchronizes the first synchronization data of the terminal to the another terminal and the another terminal instead of the terminal executes an operation corresponding to the common data of the terminal; or if the current battery level of the terminal is not less than the preset threshold, the processing module controls the communications module to send the first synchronization data of the terminal to the another terminal, so that the terminal synchronizes the first synchronization data of the terminal to the another terminal and at least one of the terminal or the another terminal executes an operation corresponding to the common data of the terminal.

According to a fourth aspect, a terminal is provided, including: a communications module configured to establish a connection between the terminal and another terminal; an acquiring module configured to acquire attribute information of the terminal and attribute information of the another terminal after the connection between the terminal and the another terminal is established, where the attribute information includes first attribute information and second attribute information, the first attribute information includes at least one of account information or status information, and the second attribute information includes at least one of capability information or type information; and a processing module configured to determine whether the second attribute information of the terminal matches the second attribute information of the another terminal; where if the second attribute information of the terminal matches the second attribute information of the another terminal, the processing module is further configured to determine, according to at least one of the first attribute information of the terminal or the first attribute information of the another terminal, whether the terminal and the another terminal belong to a same account; and if the terminal and the another terminal belong to the same account, the processing module controls the acquiring module to acquire first synchronization data of the terminal according to the second attribute information of the terminal and the second attribute information of the another terminal, where the first synchronization data is at least one of common data or personalized data; and the processing module controls the communications module to send the first synchronization data of the terminal to the another terminal, so that the terminal synchronizes the first synchronization data of the terminal to the another terminal; or if the terminal and the another terminal belong to different accounts, the processing module is configured to control the acquiring module to acquire second synchronization data of the terminal according to the second attribute information of the terminal and the second attribute information of the another terminal, where the second synchronization data includes only common data; and the processing module controls the communications module to send the second synchronization data of the terminal to the another terminal, so that the terminal synchronizes the second synchronization data of the another terminal to the another terminal; or if the second attribute information of the terminal does not match the second attribute information of the another terminal, the processing module controls the acquiring module to acquire second synchronization data of the terminal according to the second attribute information of the terminal and the second attribute information of the another terminal; and the processing module controls the communications module to send the second synchronization data of the terminal to the another terminal, so that the terminal synchronizes the second synchronization data of the another terminal to the another terminal.

According to the terminal and the terminal synchronization method in the embodiments of the present disclosure, after a connection between a smart phone and a wearable device is established, the smart phone may automatically acquire at least one of common data or personalized data of the smart phone according to at least one of capability information or type information of the wearable device and send the at least one of common data or personalized data to the wearable device, so as to implement synchronization between the smart phone and the wearable device. A user does not need to manually perform setting on the smart phone or the wearable device, which simplifies an operation and therefore improves user experience. In addition, the common data and the personalized data that are on the smart phone can be automatically synchronized to the wearable device, thereby preventing an embarrassing situation in which, for example, the user sets an alarm clock or muting on the smart phone but forgets to set an alarm clock or muting on the wearable device. In addition, for different accounts, only the common data is synchronized and the personalized data is not synchronized, which keeps usage preferences of different users unchanged and improves the user experience.

DESCRIPTION OF EMBODIMENTS

Figure 1:
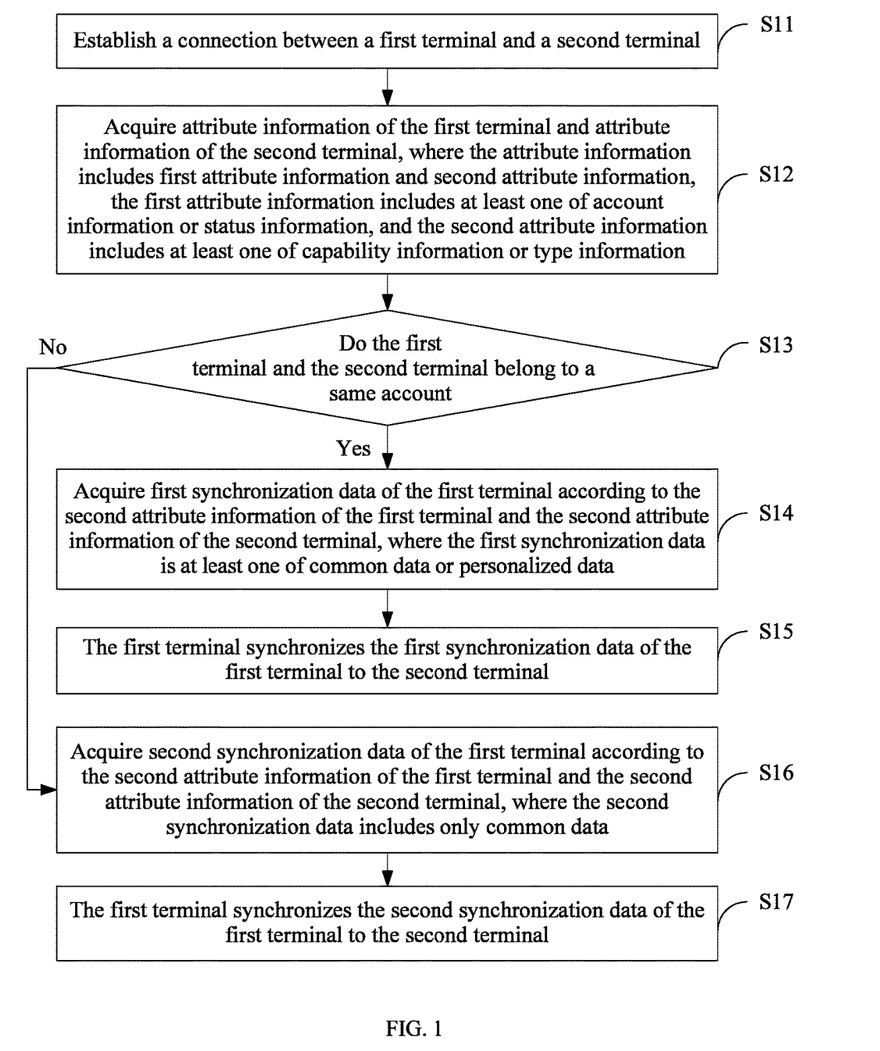
FIG. 1 is a schematic flowchart of a data synchronization method according to a first embodiment of the present disclosure.

An embodiment of the present disclosure provides a terminal synchronization method shown in FIG. 1, which is not only applied to two terminals of a data synchronization requirement, but also applied to more terminals that have a specific data synchronization requirement such as multiple home terminals of family members or terminals that are of members of a company and that have a specific requirement.

Data synchronization (or terminal synchronization) refers to that at least one second terminal that matches a first terminal automatically updates corresponding data after data of the first terminal is updated. The synchronization data includes common data and personalized data, and the common data includes external common data and local common data.

The external common data includes a notification message sent by another device to the first terminal, where the notification message includes at least one of a notification command, an identifier of a sender, all or a part of notification content, or a ringtone of a sender, where the identifier includes at least one of a number, a name, an avatar, an e-mail address, a social software account, an office address, or a home address. For example, a notification message of an incoming call includes at least one of an incoming call event (that is, a notification command for notifying a user of a new incoming call), an incoming call number, an incoming call ringtone, an avatar of a caller, or a message left by a caller (that is, all notification content). A notification message of a Short Message Service (SMS) message includes at least one of an SMS message event (that is, a notification command for notifying a user of a new SMS message), a number of an SMS message sender, an avatar of an SMS message sender, all or a part of SMS message content, or an SMS message ringtone. A notification message of social software includes at least one of a social software event (that is, a notification command for notifying a user of a new message), an identifier of a notification message initiator, all or a part of notification message content, or a notification ringtone. An advertisement push message includes at least one of a push event (that is, a notification command for notifying a user of a new push message), an identifier of an advertisement sender, all or a part of push message content, or a push message ringtone.

The local common data includes at least one of alarm clock reminder data, calendar reminder data, or sports and health fulfillment reminder data. The alarm clock reminder data includes at least one of an alarm clock reminder event (that is, a reminder command for reminding a user that a scheduled task needs to be handled now), alarm clock ringtone volume, an alarm clock icon, an alarm clock ringtone, an alarm clock ringtone time, or alarm clock reminder content. The calendar reminder data includes at least one of a calendar reminder event (that is, a reminder command for reminding a user that a scheduled task needs to be handled today), a calendar reminder ringtone, calendar reminder ringtone volume, a calendar reminder icon, a calendar reminder time, or calendar reminder content. The sports or health fulfillment reminder data includes at least one of a sports or health fulfillment reminder event (that is, a reminder command for reminding a user that scheduled sports or health data is fulfilled now), a sports or health reminder ringtone, sports or health reminder ringtone volume, a sports or health reminder icon, or sports or health reminder content.

The personalized data includes at least one of physiological data of a user, an application program personalized data setting, or an operating system personalized data setting. That the first terminal synchronizes the personalized data to the second terminal refers to that the first terminal sends the personalized data to the second terminal, so that the second terminal updates, according to the personalized data after receiving the personalized data, a setting of the second terminal or reminds a user in a manner such as vibration, a ringtone, lighting, or screen display.

The physiological data of a user includes data such as blood pressure, heart rate, electrocardiograph, body temperature, and blood lipids that are of a user, and after receiving the physiological data of a user from the first terminal, the second terminal reminds the user in a reminder manner such as vibration, a ringtone, lighting, or screen display.

The application program personalized data setting refers to preference setting that is specific to an application program and that is performed by a user, and includes at least one of an alarm clock personalized setting, a calendar personalized setting, an application program notification management setting, user information of the application program, or a sports fulfillment target setting. The alarm clock personalized setting includes an alarm clock ringtone time setting, alarm clock ringtone volume, a reminder manner setting, a reminder frequency setting (reminding once or reminding repeatedly), or the like. The calendar personalized setting includes a calendar reminder reason setting (reminding according to a time or reminding according to a geographic location), a reminder manner setting, a reminder frequency setting, or the like. The application program notification management setting includes a notification reminder manner setting such as a phone call, an SMS message, and social software.

The operating system personalized data setting refers to preference setting that is specific to an operating system of the first terminal and that is performed by a user, and includes brightness of a screen, a color of a screen backlight, a color of a keyboard light, a vibration strength, volume, a Do Not Disturb mode, a locking or main display screen wallpaper, a profile, or the like.

The first terminal may be a portable communications terminal such as a smart phone, a tablet computer, a laptop computer, or a personal digital assistant, and may also be a smart watch, a smart band, a pair of smart eyeglasses, or a wearable device embedded in a clothing accessory such as shoes. A type of the second terminal may be the same as that of the first terminal, for example, the first terminal and the second terminal are both a smart phone; or a type of the second terminal may be different from that of the first terminal, for example, the first terminal is a smart phone and the second terminal is a smart band.

Account information is identifier information of a user that uses the first terminal and the second terminal, that is, a user account. For example, the user account may be an AppleID of an Apple device, or may be a Google account. A user name of the Google account is represented by an e-mail address. The user may obtain a Google account by registering a Gmail account, or may apply for a Google account by using an existing e-mail box.

Status information refers to information that describes a status of the first terminal and a status of the second terminal, for example, a connection status, a disconnection status, connection duration, and disconnection duration that are of the first terminal and the second terminal, and for another example, a current battery level of the first terminal and a current battery level of the second terminal, whether the first terminal and the second terminal are being charged, whether a provided battery level indicator is blinking, and a blinking color.

Capability information refers to information that describes a function supported by the first terminal and the second terminal, for example, whether the first terminal and the second terminal support step counting, support blood pressure test, support an alarm clock function, and are provided with a screen.

Type information refers to information that describes a type of the first terminal and a type of the second terminal, for example, the first terminal and the second terminal are a wristwatch, a smart band, a ring, or a smart phone.

Referring to FIG. 1, the terminal synchronization method in this embodiment includes:

Step S11: Establish a connection between a first terminal and a second terminal.

A process of establishing the connection between the first terminal and the second terminal may include, but is not limited to: the first terminal receives a connection request sent by the second terminal, where the connection request carries a communication identifier of the second terminal, and the communication identifier includes information required for establishing the connection, such as an identity (ID) and a Bluetooth address that are of the second terminal. The first terminal may establish the connection to the second terminal according to the communication identifier.

That the first terminal is a smart phone, the second terminal is a wearable device, and the first terminal is connected to the second terminal by using Bluetooth is used as an example. The wearable device periodically (for example, every second) sends an ADV-IND message. After receiving the ADV-IND message by means of scanning, the smart phone sends a scan request (SCAN-REQ) message, so as to scan a Bluetooth device near the smart phone. After receiving the SCAN-REQ message, the wearable device that has enabled a Bluetooth function replies with a scan response (SCAN-RSP) message, where the SCAN-RSP message carries information about the wearable device, such as an ID or a Bluetooth address. The smart phone may establish the connection to the corresponding wearable device according to the Bluetooth address carried in the SCAN-RSP message.

Certainly, the connection between the first terminal and the second terminal may be established in another short-distance wireless communication manner such as infrared or wireless fidelity (Wi-Fi), or in a remote communication manner such as a mobile communication manner based on second-generation mobile communications technology (2G), third-generation mobile communications technology (3G), and/or fourth-generation mobile communications technology (4G).

Step S12: Acquire attribute information of the first terminal and attribute information of the second terminal, where the attribute information includes first attribute information and second attribute information, the first attribute information includes at least one of account information or status information, and the second attribute information includes at least one of capability information or type information.

Step S13: Determine, according to at least one of first attribute information of the first terminal or first attribute information of the second terminal, whether the first terminal and the second terminal belong to a same account.

Whether the first terminal and the second terminal belong to the same account refers to whether a user that uses the first terminal is the same as a user that uses the second terminal, that is, whether a user account of the first terminal is the same as a user account of the second terminal.

If the first terminal and the second terminal belong to the same account, perform steps S14 and S15; if the first terminal and the second terminal belong to different accounts, perform steps S16 and S17.

Step S14: Acquire first synchronization data of the first terminal according to the second attribute information of the first terminal and the second attribute information of the second terminal, where the first synchronization data is at least one of common data or personalized data.

Step S15: The first terminal synchronizes the first synchronization data of the first terminal to the second terminal.

For example, when the connection between the first terminal and the second terminal is established, second attribute information of a smart band that is acquired includes that the first terminal is a smart phone, the second terminal is the smart band, and the smart band is not provided with a screen. When the smart phone has an incoming call, first synchronization data that is acquired and sent by the smart phone to the smart band includes personalized data, that is, call notification reminder manner setting included in an application program notification management setting, such as vibration, a ringtone, or lighting. In this case, the smart phone sends only the personalized data to the smart band, and the smart band reminds a user in a manner such as vibration, a ringtone, or lighting.

For another example, when the connection between the first terminal and the second terminal is established, second attribute information of a smart band that is acquired includes that the first terminal is a smart phone, the second terminal is a smart wristwatch, and the smart wristwatch is provided with a screen. When the smart phone has an incoming call, the smart phone reminds a user of a new incoming call in a manner such as vibration, a ringtone, or lighting. First synchronization data that is acquired and sent by the smart phone to the smart wristwatch includes external common data, that is, at least one of an incoming call event, a message left by a caller, an incoming call ringtone, an avatar of a caller, or a message left by a caller. The smart wristwatch reminds the user by means of screen display according to the received external common data. Certainly, the first synchronization data that is acquired and sent by the smart phone to the smart wristwatch may include personalized data such as vibration, a ringtone, and lighting, so that the smart wristwatch reminds the user in a combination of manners such as screen display, vibration, a ringtone, and lighting.

Step S16: Acquire second synchronization data of the first terminal according to the second attribute information of the first terminal and the second attribute information of the second terminal, where the second synchronization data includes only common data.

Step S17: The first terminal synchronizes the second synchronization data of the first terminal to the second terminal.

Based on the foregoing descriptions, in an application scenario in which the first terminal is a smart phone and the second terminal is a wearable device, after a connection is established, the smart phone may automatically acquire at least one of common data or personalized data of the smart phone according to at least one of capability information or type information of the wearable device, and send the at least one of common data or personalized data to the wearable device, so as to implement synchronization between the smart phone and the wearable device. A user does not need to manually perform setting on the smart phone or the wearable device, which simplifies an operation and therefore improves user experience.

In addition, in this embodiment, for the first terminal and the second terminal that belong to a same account, the common data can be automatically synchronized and the personalized data can also be automatically synchronized, thereby further improving the user experience and preventing an embarrassing situation in which, for example, the user sets an alarm clock or muting on the first terminal but forgets to set an alarm clock or muting on the second device. In addition, for the first terminal and the second terminal that belong to different accounts, only the common data is synchronized, but the personalized data is not synchronized, which keeps a usage preference of a user that uses the first terminal and that of a user that uses the second terminal unchanged and improves the user experience.

In this embodiment of the present disclosure, whether the first terminal and the second terminal belong to the same account may be determined according to at least one of account information of the first terminal or account information of the second terminal. Specifically, it is determined whether the account information of the first terminal is the same as the account information of the second terminal. If the account information of the first terminal is the same as the account information of the second terminal, it is determined that the first terminal and the second terminal belong to the same account; if the account information of the first terminal is different from the account information of the second terminal, it is determined that the first terminal and the second terminal belong to different accounts. For example, the first terminal and the second terminal are both an Apple device and the account information is an AppleID. If an AppleID of the first terminal is the same as an AppleID of the second terminal, it is determined that the first terminal and the second terminal belong to the same account; if an AppleID of the first terminal is different from an AppleID of the second terminal, it is determined that the first terminal and the second terminal belong to different accounts.

In this embodiment of the present disclosure, whether the first terminal and the second terminal belong to the same account may be determined according to at least one of status information of the first terminal or status information of the second terminal. Specifically, duration for establishing the connection between the first terminal and the second terminal is determined according to at least one of the status information of the first terminal or the status information of the second terminal. If the duration is greater than or equal to a preset threshold, it is determined that the first terminal and the second terminal belong to the same account; if the duration is less than a preset threshold, it is determined that the first terminal and the second terminal belong to different accounts. For example, if total duration during which the first terminal continuously or discontinuously maintains a connection to the second terminal before the connection is greater than the preset time threshold (for example, 12 hours), it is determined that the first terminal and the second terminal belong to the same account; otherwise, it is determined that the first terminal and the second terminal belong to different accounts.

Certainly, in a case in which the first attribute information acquired in the foregoing step S12 includes not only the account information but also the status information, in this embodiment of the present disclosure, whether the first terminal and the second terminal belong to the same account may be preferentially determined according to at least one of the account information of the first terminal or the account information of the second terminal.

In this embodiment of the present disclosure, for the first terminal and the second terminal that belong to the same account, the first synchronization data sent by the first terminal to the second terminal is data that is of the first terminal and that can be synchronized to the second terminal. That is, a process of acquiring the first synchronization data in the foregoing step S14 may be: determining whether the second attribute information of the first terminal matches the second attribute information of the second terminal. If the second attribute information of the first terminal matches the second attribute information of the second terminal, common data that is of the first terminal and that is corresponding to the second attribute information of the second terminal and personalized data that is of the first terminal and that is corresponding to the second attribute information of the second terminal are acquired; or if the second attribute information of the first terminal does not match the second attribute information of the second terminal, only common data that is of the first terminal and that is corresponding to the second attribute information of the second terminal is acquired.

The matching refers to that a device type of the first terminal is the same as that of the second terminal, and/or at least one capability of the first terminal is the same as that of the second terminal. For example, if the first terminal supports step counting, and the second terminal also supports step counting, it indicates that the second attribute information of the first terminal matches the second attribute information of the second terminal and the common data and the personalized data are acquired. In this case, the personalized data may be a daily or monthly step counting target set by a user, and the first synchronization data corresponding to capability information and/or type information of the second terminal is the common data and the daily or monthly step counting target set by the user. For another example, the first terminal and the second terminal are both a smart wristwatch and the common data and the personalized data are acquired. In this case, the personalized data may be brightness of a screen. If capability information and/or type information of the first terminal do/does not match that of the second terminal, only the common data is acquired. For still another example, a smart phone supports an alarm clock, blood pressure test, heart rate test, and step counting and a smart band, a smart wristwatch, and smart shoes are connected to the smart phone. The smart band is provided with a screen and supports blood pressure test and vibration test. The smart wristwatch is provided with a screen and supports heart rate test and an alarm clock. The smart shoes are not provided with a screen and support step counting. If the smart phone, the smart band, and the smart shoes belong to a same account, but the smart phone and the smart wristwatch belong to different accounts, the smart phone may acquire communication data, blood pressure data, and a vibration strength that can be synchronized to the smart band, and step counting data that can be synchronized to the smart shoes, but may not acquire heart rate data or alarm clock personalized setting that is supported by the smart wristwatch. Certainly, the smart phone may acquire the heart rate data and the alarm clock personalized data setting that are supported by the smart wristwatch, but may not send the heart rate data or the alarm clock personalized data setting to the smart wristwatch, that is, synchronization is not implemented.

That is, in this embodiment of the present disclosure, whether the data that is of the first terminal and that can be synchronized to the second terminal exists is determined according to at least one of the capability information or the type information that is of the first terminal and the second terminal. It may be understood that: if the data exists, the first synchronization data or the second synchronization data of the first terminal is acquired, and correspondingly steps S15 and S17 are performed; if the data does not exist, synchronization is stopped, or each step before step S14 is re-executed to perform next synchronization, or at least one of the first terminal or the second terminal reminds a user of the following: Currently, the data that is of the first terminal and that can be synchronized to the second terminal does not exist, and please perform synchronization later.

Figure 2:
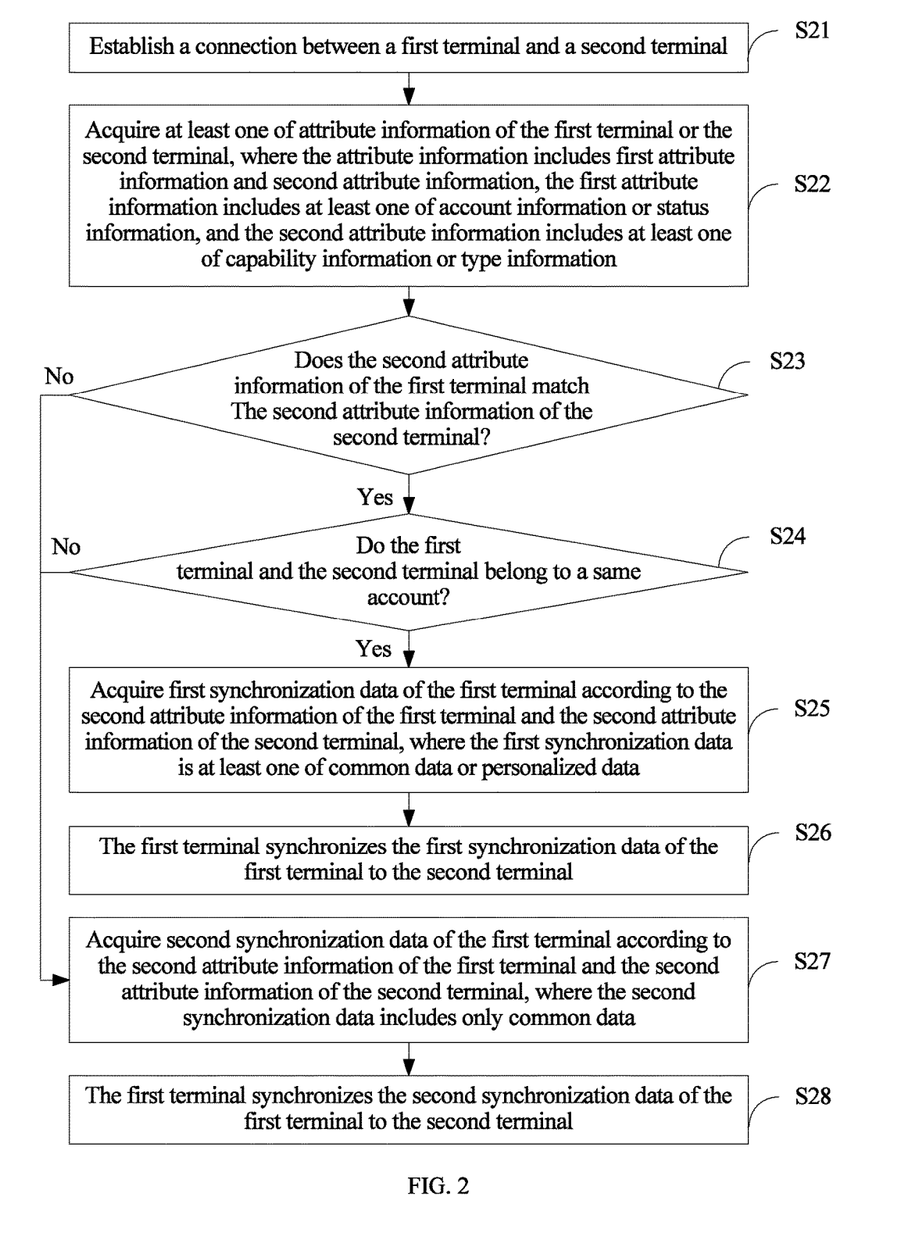
FIG. 2 is a schematic flowchart of a data synchronization method according to a second embodiment of the present disclosure.

In the foregoing embodiment, whether the first terminal and the second terminal belong to the same account is first determined, and then for the first terminal and the second terminal that belong to the same account, the common data and the personalized data that are of the first terminal and that can be synchronized to the second terminal are determined. Different from the foregoing method, a method shown in FIG. 2 according to another embodiment includes:

Step S21: Establish a connection between a first terminal and a second terminal.

Step S22: Acquire at least one of attribute information of the first terminal or attribute information of the second terminal, where the attribute information includes first attribute information and second attribute information, the first attribute information includes at least one of account information or status information, and the second attribute information includes at least one of capability information or type information.

Step S23: Determine whether the second attribute information of the first terminal matches the second attribute information of the second terminal.

If the second attribute information of the first terminal matches the second attribute information of the second terminal, perform steps S24 to S28; if the second attribute information of the first terminal does not match the second attribute information of the second terminal, perform steps S27 and S28.

Step S24: Determine, according to at least one of first attribute information of the first terminal or first attribute information of the second terminal, whether the first terminal and the second terminal belong to a same account.

If the first terminal and the second terminal belong to the same account, perform steps S25 and S26; if the first terminal and the second terminal belong to different accounts, perform steps S27 and S28.

Step S25: Acquire first synchronization data of the first terminal according to the second attribute information of the first terminal and the second attribute information of the second terminal, where the first synchronization data is at least one of common data or personalized data.

Step S26: The first terminal synchronizes the first synchronization data of the first terminal to the second terminal.

Step S27: Acquire second synchronization data of the first terminal according to the second attribute information of the first terminal and the second attribute information of the second terminal, where the second synchronization data includes only common data.

Step S28: The first terminal synchronizes the second synchronization data of the first terminal to the second terminal.

As can be seen, a difference from the foregoing embodiment is that, in this embodiment, the data that is of the first terminal and that can be synchronized to the second terminal is first determined, then whether the first terminal and the second terminal belong to the same account is determined, and therefore whether the personalized data is sent to the second terminal is determined.

In an actual application scenario, in this embodiment of the present disclosure, when the first synchronization data of the first terminal is synchronized, that is, when the foregoing steps S25 and S26 are performed, it needs to be considered whether current status information of the first terminal and current status information of the second terminal allow execution of an operation corresponding to the first synchronization data.

That the first terminal is a smart phone, the second terminal is a smart wristwatch, and the status information is whether a terminal is being charged is used as an example. Whether the first terminal is being charged is determined according to status information of the first terminal. If the first terminal is being charged, the first terminal synchronizes the first synchronization data of the first terminal to the second terminal and the second terminal instead of the first terminal executes an operation corresponding to the common data of the first terminal; or if the first terminal is not being charged, the first terminal synchronizes the first synchronization data of the first terminal to the second terminal, and at least one of the first terminal or the second terminal executes an operation corresponding to the common data of the first terminal. For example, when the smart phone has an incoming call, the smart phone acquires and sends common data, such as at least one of an incoming call event, an incoming call number, an incoming call ringtone, an incoming call event, or a message left by a caller to a smart wristwatch. If the smart phone is being charged, for the sake of safety, the foregoing information is displayed by a screen of the smart wristwatch and not displayed by the smart phone.

Similarly, that the status information is a current battery level is used as an example. Whether a current battery level of the first terminal is less than a preset threshold is determined according to status information of the first terminal, where the preset threshold may specifically be a battery level indicator. For example, when the current battery level is less than 10%, the battery level indicator turns red; when the battery level is between 10% and 90%, the battery level indicator turns yellow; when the current battery level is greater than or equal to 90%, the battery level indicator turns green. If the current battery level is less than the preset threshold, the first terminal synchronizes the first synchronization data of the first terminal to the second terminal and the second terminal instead of the first terminal executes an operation corresponding to the common data of the first terminal; or if the current battery level is not less than a preset threshold, the first terminal synchronizes the first synchronization data of the first terminal to the second terminal, and at least one of the first terminal or the second terminal executes an operation corresponding to the common data of the first terminal.

Certainly, in a case in which the status information includes not only whether the terminal is being charged but also the current battery level, in this embodiment of the present disclosure, whether the first terminal executes the operation corresponding to the common data of the first terminal may be preferentially determined according to whether the current battery level of the first terminal is less than the preset threshold.

Figure 3:
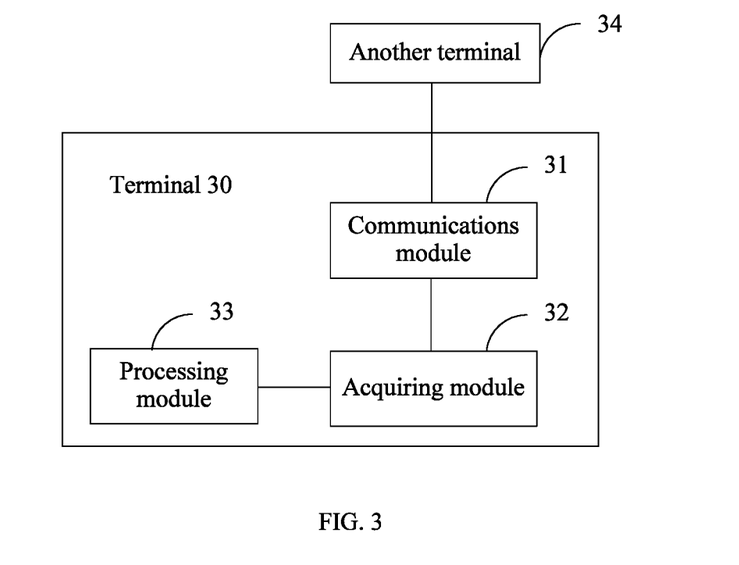
FIG. 3 is a schematic block diagram of a principle of a terminal according to an embodiment of the present disclosure.

FIG. 3 is a schematic block diagram of a principle of a terminal according to an embodiment of the present disclosure. As shown in FIG. 3, the terminal 30 includes a communications module 31, an acquiring module 32, and a processing module 33.

The communications module 31 is configured to establish a connection between the terminal 30 and another terminal 34.

The acquiring module 32 is configured to acquire attribute information of the terminal 30 and attribute information of the another terminal 34 after the connection between the terminal 30 and the another terminal 34 is established, where the attribute information includes first attribute information and second attribute information, the first attribute information includes at least one of account information or status information, and the second attribute information includes at least one of capability information or type information.

The processing module 33 is configured to determine, according to at least one of the first attribute information of the terminal 30 or the first attribute information of the another terminal 34, whether the terminal 30 and the another terminal 34 belong to a same account.

If the terminal 30 and the another terminal 34 belong to the same account, the processing module 33 is further configured to control the acquiring module 32 to acquire first synchronization data of the terminal 30 according to the second attribute information of the terminal 30 and the second attribute information of the another terminal 34, where the first synchronization data is at least one of common data or personalized data. Further, the processing module 33 controls the communications module 31 to send the first synchronization data of the terminal 30 to the another terminal 34, so that the terminal 30 synchronizes the first synchronization data of the terminal 30 to the another terminal 34.

If the terminal 30 and the another terminal 34 belong to different accounts, the processing module 33 is configured to control the acquiring module 32 to acquire second synchronization data of the terminal 30 according to the second attribute information of the terminal 30 and the second attribute information of the another terminal 34, where the second synchronization data includes only common data. Further, the processing module 33 controls the communications module 31 to send the second synchronization data of the terminal 30 to the another terminal 34, so that the terminal 30 synchronizes the second synchronization data of the terminal 30 to the another terminal 34.

In this embodiment, the processing module 33 may determine, according to at least one of account information of the terminal 30 or account information of the another terminal 34, whether the terminal 30 and the another terminal 34 belong to the same account. Specifically, the processing module 33 determines whether the account information of the terminal 30 is the same as the account information of the another terminal 34. If the account information of the terminal 30 is the same as the account information of the another terminal 34, the processing module 33 determines that the terminal 30 and the another terminal 34 belong to the same account; or if the account information of the terminal 30 is different from the account information of the another terminal 34, the processing module 33 determines that the terminal 30 and the another terminal 34 belong to different accounts.

The processing module 33 may also determine, according to at least one of status information of the terminal 30 or status information of the another terminal 34, whether the terminal 30 and the another terminal 34 belong to the same account. Specifically, the processing module 33 determines, according to at least one of the status information of the terminal 30 or the status information of the another terminal 34, duration for establishing the connection between the terminal 30 and the another terminal 34. If the duration is greater than or equal to a preset threshold, the processing module 33 determines that the terminal 30 and the another terminal 34 belong to the same account; or if the duration is less than a preset threshold, the processing module 33 determines that the terminal 30 and the another terminal 34 belong to different accounts.

Certainly, in a case in which the first attribute information acquired by the acquiring module 32 includes not only the account information but also the status information, the processing module 33 may preferentially determine, according to the at least one of account information of the terminal 30 or the account information of the another terminal 34, whether the terminal 30 and the another terminal 34 belong to the same account.

For the terminal 30 and the another terminal 34 that belong to the same account, the first synchronization data sent by the terminal 30 to the another terminal 34 is data that is of the terminal 30 and that can be synchronized to the another terminal 34. That is, a principle in which the processing module 33 controls the acquiring module 32 to acquire the first synchronization data may be: determining whether the second attribute information of the terminal 30 matches the second attribute information of the another terminal 34. The matching refers to that a device type of the terminal 30 is the same as that of the another terminal 34, and/or at least one capability of the terminal 30 is the same as that of the another terminal 34. For example, if the terminal 30 supports step counting, and the another terminal 34 also supports step counting, it indicates that the second attribute information of the terminal 30 matches the second attribute information of the another terminal 34. If the second attribute information of the terminal 30 matches the second attribute information of the another terminal 34, the processing module 33 controls the acquiring module 32 to acquire common data that is of the terminal 30 and that is corresponding to the second attribute information of the another terminal 34 and personalized data that is of the terminal 30 and that is corresponding to the second attribute information of the another terminal 34; or if the second attribute information of the terminal 30 does not match the second attribute information of the another terminal 34, the processing module 33 controls the acquiring module 32 to acquire only common data that is of the terminal 30 and that is corresponding to the second attribute information of the another terminal 34.

The foregoing processing module 33 first determines whether the terminal 30 and the another terminal 34 belong to the same account, and then determines, for the terminal 30 and the another terminal 34 that belong to the same account, the common data and the personalized data that are at the terminal 30 and can be synchronized to the another terminal 34.

The processing module 33 may also first determine the data that is of the terminal 30 and that can be synchronized to the another terminal 34, and then determine whether the terminal 30 and the another terminal 34 belong to the same account, so as to determine whether to send the personalized data to the another terminal 34. Specifically, after the acquiring module 32 acquires the attribute information of the terminal 30 and the attribute information of the another terminal 34, the processing module 33 determines whether the second attribute information of the terminal 30 matches the second attribute information of the another terminal 34.

If the second attribute information of the terminal 30 matches the second attribute information of the another terminal 34, the processing module 33 determines, according to at least one of the first attribute information of the terminal 30 or the first attribute information of the another terminal 34, whether the terminal 30 and the another terminal 34 belong to the same account. If the terminal 30 and the another terminal 34 belong to the same account, the processing module 33 controls the acquiring module 32 to acquire first synchronization data of the terminal 30 according to the second attribute information of the terminal 30 and the second attribute information of the another terminal 34; further, the processing module 33 controls the communications module 31 to send the first synchronization data of the terminal 30 to the another terminal 34, so that the terminal 30 synchronizes the first synchronization data of the terminal 30 to the another terminal 34; or if the terminal 30 and the another terminal 34 belong to different accounts, the processing module 33 controls the acquiring module 32 to acquire second synchronization data of the terminal 30 according to the second attribute information of the terminal 30 and the second attribute information of the another terminal 34 and the processing module 33 controls the communications module 31 to send the second synchronization data of the terminal 30 to the another terminal 34, so that the terminal 30 synchronizes the second synchronization data of the terminal 30 to the another terminal 34.

If the second attribute information of the terminal 30 does not match the second attribute information of the another terminal 34, the processing module 33 controls the acquiring module 32 to acquire second synchronization data of the terminal 30 according to the second attribute information of the terminal 30 and the second attribute information of the another terminal 34; further, the processing module 33 controls the communications module 31 to send the second synchronization data of the terminal 30 to the another terminal 34, so that the terminal 30 synchronizes the second synchronization data of the terminal 30 to the another terminal 34.

In this embodiment, when the terminal 30 synchronizes the first synchronization data of the terminal 30 to the another terminal 34, the processing module 33 needs to determine whether current status information of the terminal 30 and current status information of the another terminal 34 allow execution of an operation corresponding to the first synchronization data.

That the status information is whether a terminal is being charged is used as an example. The processing module 33 determines, according to status information of the terminal 30, whether the terminal 30 is being charged. If the terminal 30 is being charged, the processing module 33 controls the communications module 31 to send the first synchronization data of the terminal 30 to the another terminal 34, so that the terminal 30 synchronizes the first synchronization data of the terminal 30 to the another terminal 34 and the another terminal 34 instead of the terminal 30 executes an operation corresponding to the common data of the terminal 30; or if the terminal 30 is not being charged, the processing module 33 controls the communications module 31 to send the first synchronization data of the terminal 30 to the another terminal 34, so that the terminal 30 synchronizes the first synchronization data of the terminal 30 to the another terminal 34 and at least one of the terminal 30 or the another terminal 34 executes an operation corresponding to the common data of the terminal 30.

That the status information is a current battery level is used as an example. The processing module 33 determines, according to status information of the terminal 30, whether a current battery level of the terminal 30 is less than a preset threshold. If the current battery level is less than the preset threshold, the processing module 33 controls the communications module 31 to send the first synchronization data of the terminal 30 to the another terminal 34, so that the terminal 30 synchronizes the first synchronization data of the terminal 30 to the another terminal 34 and the another terminal 34 instead of the terminal 30 executes an operation corresponding to the common data of the terminal 30; or if the current battery level is not less than a preset threshold, the processing module 33 controls the communications module 31 to send the first synchronization data of the terminal 30 to the another terminal 34, so that the terminal 30 synchronizes the first synchronization data of the terminal 30 to the another terminal 34 and at least one of the terminal 30 or the another terminal 34 executes an operation corresponding to the common data of the terminal 30.

All the modules of the terminal 30 that are described above correspondingly execute the synchronization methods in the foregoing embodiments, which have a same technical effect as the synchronization method.

It should be understood that the foregoing implementation manner of the terminal 30 is merely exemplary. The module division is merely a division of logical functions, and may be another division manner in actual implementation. For example, two modules may be integrated into another system, or some features may be ignored or not performed. In addition, coupling or a communications connection between modules may be implemented by using some interfaces or be implemented in electronic or another form. As components of the terminal 30, the foregoing two modules may or may not be physical blocks; may be located in one position or may be distributed on multiple network units; and may be implemented in a form of a software functional block, or may be implemented in a hardware form, for example, a terminal 40 shown in FIG. 4.

Figure 4:
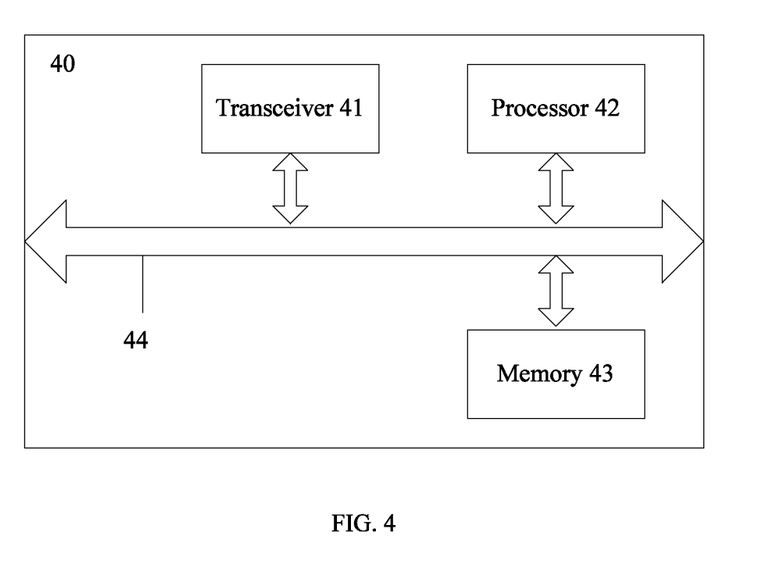
FIG. 4 is a schematic structural diagram of a terminal according to an embodiment of the present disclosure.

As shown in FIG. 4, the terminal 40 includes a transceiver 41, a processor 42, a memory 43, and a bus 44. The transceiver 41, the processor 42, and the memory 43 are connected by using the bus 44.

The transceiver 41 is configured to establish a connection between the terminal 40 and another terminal.

The memory 43 may be one or more of a floppy disk, a Universal Serial Bus (USB) flash drive, a removable hard disk, a read-only memory (ROM), a random-access memory (RAM), a magnetic disk, or an optical disc of a computer. The memory 43 stores an application program used to implement data synchronization.

The processor 42 invokes the application program stored in the memory 43 to execute the following operations:

After a connection between the transceiver 41 and the another terminal 34 is established, the processor 42 acquires attribute information of the terminal 40 and the another terminal, where the attribute information includes first attribute information and second attribute information, the first attribute information includes at least one of account information or status information, and the second attribute information includes at least one of capability information or type information.

Optionally, the processor 42 determines, according to at least one of the first attribute information of the terminal 40 or the first attribute information of the another terminal, whether the terminal 40 and the another terminal belong to a same account.

If the terminal 40 and the another terminal belong to the same account, the processor 42 acquires first synchronization data of the terminal 40 according to the second attribute information of the terminal 40 and the second attribute information of the another terminal, where the first synchronization data is at least one of common data or personalized data and controls the transceiver 41 to send the first synchronization data of the terminal 40 to the another terminal, so that the terminal 40 synchronizes the first synchronization data of the terminal 40 to the another terminal.

If the terminal 40 and the another terminal belong to different accounts, the processor 42 acquires second synchronization data of the terminal 40 according to the second attribute information of the terminal 40 and the second attribute information of the another terminal, where the second synchronization data includes only common data and controls the transceiver 41 to send the second synchronization data of the terminal 40 to the another terminal, so that the terminal 40 synchronizes the second synchronization data of the terminal 40 to the another terminal.

Optionally, the processor 42 may determine, according to at least one of account information of the terminal 40 or account information of the another terminal, whether the terminal 40 and the another terminal belong to the same account. Specifically, the processor 42 determines whether the account information of the terminal 40 is the same as the account information of the another terminal. If the account information of the terminal 40 is the same as the account information of the another terminal, the processor 42 determines that the terminal 40 and the another terminal belong to the same account; or if the account information of the terminal 40 is different from the account information of the another terminal, the processor 42 determines that the terminal 40 and the another terminal belong to different accounts.

Optionally, the processor 42 may also determine, according to at least one of status information of the terminal 40 or status information of the another terminal, whether the terminal 40 and the another terminal belong to the same account. Specifically, the processor 42 determines, according to at least one of the status information of the terminal 40 or the status information of the another terminal, duration for establishing the connection between the terminal 40 and the another terminal. If the duration is greater than or equal to a preset threshold, the processor 42 determines that the terminal 40 and the another terminal belong to the same account; or if the duration is less than a preset threshold, the processor 42 determines that the terminal 40 and the another terminal belong to different accounts.

Optionally, in a case in which the first attribute information acquired by the processor 42 includes not only the account information but also the status information, the processor 42 may preferentially determine, according to at least one of the account information of the terminal 40 or the account information of the another terminal, whether the terminal 40 and the another terminal belong to the same account.

For the terminal 40 and the another terminal that belong to the same account, the first synchronization data sent by the terminal 40 to the another terminal is data that is of the terminal 40 and that can be synchronized to the another terminal. That is, a process of acquiring the first synchronization data by the processor 42 may be: determining whether the second attribute information of the terminal 40 matches the second attribute information of the another terminal. The matching refers to that a device type of the terminal 40 is the same as that of the another terminal, and/or at least one capability of the terminal 40 is the same as that of the another terminal. For example, if the terminal 40 supports step counting, and the another terminal also supports step counting, it indicates that the second attribute information of the terminal 40 matches the second attribute information of the another terminal. If the second attribute information of the terminal 40 matches the second attribute information of the another terminal, the processor 42 acquires common data that is of the terminal 40 and that is corresponding to the second attribute information of the another terminal and personalized data that is of the terminal 40 and that is corresponding to the second attribute information of the another terminal; or if the second attribute information of the terminal 40 does not match the second attribute information of the another terminal, the processor 42 acquires only common data that is of the terminal 40 and that is corresponding to the second attribute information of the another terminal.

The foregoing processor 42 first determines whether the terminal 40 and the another terminal belong to the same account, and then determines, for the terminal 40 and the another terminal that belong to the same account, the common data and the personalized data that are at the terminal 40 and can be synchronized to the another terminal.

Optionally, the processor 42 may also first determine the data that is of the terminal 40 and that can be synchronized to the another terminal, and then determine whether the terminal 40 and the another terminal belong to the same account, so as to determine whether to send the personalized data to the another terminal. Specifically, after acquiring the attribute information of the terminal 40 and the another terminal, the processor 42 determines whether the second attribute information of the terminal 40 matches the second attribute information of the another terminal.

If the second attribute information of the terminal 40 matches the second attribute information of the another terminal, the processor 42 determines, according to at least one of the first attribute information of the terminal 40 or the first attribute information of the another terminal, whether the terminal 40 and the another terminal belong to the same account. If the terminal 40 and the another terminal belong to the same account, the processor 42 acquires first synchronization data of the terminal 40 according to the second attribute information of the terminal 40 and the second attribute information of the another terminal and controls the transceiver 41 to send the first synchronization data of the terminal 40 to the another terminal, so that the terminal 40 synchronizes the first synchronization data of the terminal 40 to the another terminal; or if the terminal 40 and the another terminal belong to different accounts, the processor 42 acquires second synchronization data of the terminal 40 according to the second attribute information of the terminal 40 and the second attribute information of the another terminal and controls the transceiver 41 to send the second synchronization data of the terminal 40 to the another terminal, so that the terminal 40 synchronizes the second synchronization data of the terminal 40 to the another terminal.

If the second attribute information of the terminal 40 does not match the second attribute information of the another terminal, the processor 42 acquires second synchronization data of the terminal 40 according to the second attribute information of the terminal 40 and the second attribute information of the another terminal and controls the transceiver 41 to send the second synchronization data of the terminal 40 to the another terminal, so that the terminal 40 synchronizes the second synchronization data of the terminal 40 to the another terminal.

When the terminal 40 synchronizes the first synchronization data of the terminal 40 to the another terminal, the processor 42 needs to determine whether current status information of the terminal 40 and current status information of the another terminal allow execution of an operation corresponding to the first synchronization data.

Optionally, that the status information is whether a terminal is being charged is used as an example. The processor 42 determines, according to status information of the terminal 40, whether the terminal 40 is being charged. If the terminal 40 is being charged, the processor 42 controls the transceiver 41 to send the first synchronization data of the terminal 40 to the another terminal, so that the terminal 40 synchronizes the first synchronization data of the terminal 40 to the another terminal and the another terminal instead of the terminal 40 executes an operation corresponding to the common data of the terminal 40; or if the terminal 40 is not being charged, the processor 42 controls the transceiver 41 to send the first synchronization data of the terminal 40 to the another terminal, so that the terminal 40 synchronizes the first synchronization data of the terminal 40 to the another terminal and at least one of the terminal 40 or the another terminal executes an operation corresponding to the common data of the terminal 40.

Optionally, that the status information is a current battery level is used as an example. The processor 42 determines, according to status information of the terminal 40, whether a current battery level of the terminal 40 is less than a preset threshold. If the current battery level is less than the preset threshold, the processor 42 controls the transceiver 41 to send the first synchronization data of the terminal 40 to the another terminal, so that the terminal 40 synchronizes the first synchronization data of the terminal 40 to the another terminal and the another terminal instead of the terminal 40 executes an operation corresponding to the common data of the terminal 40; or if the current battery level is not less than a preset threshold, the processor 42 controls the transceiver 41 to send the first synchronization data of the terminal 40 to the another terminal, so that the terminal 40 synchronizes the first synchronization data of the terminal 40 to the another terminal and at least one of the terminal 40 or the another terminal executes an operation corresponding to the common data of the terminal 40.

All the components of the terminal 40 that are described above correspondingly execute the synchronization methods in the foregoing embodiments. It should be understood that, when the foregoing functions in the embodiments are implemented in the form of a software functional unit and sold or used as an independent product, the functions may be stored in a computer-readable storage medium. That is, the embodiments of the present disclosure may be implemented in the form of a software product, where the software product includes several instructions for instructing a computer device (which may be a personal computer, a server, a network device, or the like) to perform all or some of the steps of the methods described in the embodiments of the present disclosure.

Based on this, the foregoing descriptions are merely embodiments of the present disclosure, and the protection scope of the present disclosure is not limited thereto. All equivalent structure or process changes made according to the content of this specification and accompanying drawings or by directly or indirectly applying the present disclosure in other related technical fields shall fall within the protection scope of the present disclosure.

What is claimed is:

1. A terminal synchronization method implemented by a first terminal, the method comprising:
   establishing a connection with a second terminal;
   acquiring attribute information of the first terminal and attribute information of the second terminal, wherein the attribute information of the first terminal and the attribute information of the second terminal both comprise first attribute information and second attribute information, wherein the first attribute information comprises at least one of account information or status information, and wherein the second attribute information comprises at least one of capability information or type information;
   determining, according to at least one of first attribute information of the first terminal or first attribute information of the second terminal, whether the first terminal and the second terminal belong to a same account;
   acquiring first synchronization data of the first terminal according to second attribute information of the first terminal and second attribute information of the second terminal when the first terminal and the second terminal belong to the same account, wherein the first synchronization data are at least one of common data or personalized data;
   synchronizing, by the first terminal, the first synchronization data of the first terminal to the second terminal when the first terminal and the second terminal belong to the same account;
   acquiring second synchronization data of the first terminal according to the second attribute information of the first terminal and the second attribute information of the second terminal when the first terminal and the second terminal do not belong to the same account, wherein the second synchronization data comprise only common data; and
   synchronizing, by the first terminal, the second synchronization data of the first terminal to the second terminal when the first terminal and the second terminal do not belong to the same account.

2. The method according to claim 1, wherein determining whether the first terminal and the second terminal belong to the same account comprises:
   determining, according to at least one of status information of the first terminal or status information of the second terminal, a duration for establishing the connection;
   determining that the first terminal and the second terminal belong to the same account when the duration is greater than or equal to a preset threshold; and
   determining that the first terminal and the second terminal belong to different accounts when the duration is less than the preset threshold.

3. The method according to claim 1, wherein the determining whether the first terminal and the second terminal belong to a same account comprises:
   determining whether first account information of the first terminal is the same as second account information of the second terminal;
   determining that the first terminal and the second terminal belong to the same account when the first account information is the same as the second account information; and
   determining that the first terminal and the second terminal belong to different accounts when the first account information is different from the second account information.

4. The method according to claim 1, wherein acquiring first synchronization data comprises:
   determining whether the second attribute information of the first terminal matches the second attribute information of the second terminal;
   acquiring common data that are of the first terminal and correspond to the second attribute information of the second terminal and acquiring personalized data that are of the first terminal and correspond to the second attribute information of the second terminal when the second attribute information of the first terminal matches the second attribute information of the second terminal; and
   acquiring only common data that are of the first terminal and correspond to the second attribute information of the second terminal when the second attribute information of the first terminal does not match the second attribute information of the second terminal.

5. The method according to claim 1, wherein synchronizing the first synchronization data comprises:
   determining, according to first status information of the first terminal, whether the first terminal is being charged;
   synchronizing, by the first terminal, the first synchronization data of the first terminal to the second terminal;
   executing, by the second terminal, an operation corresponding to first common data of the first terminal when the first terminal is being charged; and
   executing, by at least one of the first terminal or the second terminal, an operation corresponding to the first common data when the first terminal is not being charged.

6. The method according to claim 1, wherein synchronizing the first synchronization data comprises:
   determining, according to first status information of the first terminal, whether a current battery level of the first terminal is less than a preset threshold;
   synchronizing, by the first terminal, the first synchronization data of the first terminal to the second terminal;
   executing, by the second terminal, an operation corresponding to first common data of the first terminal when the current battery level is less than the preset threshold; and
   executing, by at least one of the first terminal or the second terminal, an operation corresponding to first common data of the first terminal when the current battery level is not less than the preset threshold.

7. A terminal synchronization method implemented by a first terminal, the method comprising:
   establishing a connection with a second terminal;
   acquiring at least one of attribute information of the first terminal or attribute information of the second terminal, wherein the attribute information of the first terminal and the attribute information of the second terminal both comprise first attribute information and second attribute information, wherein the first attribute information comprises at least one of account information or status information, and wherein the second attribute information comprises at least one of capability information or type information;

determining whether second attribute information of the first terminal matches second attribute information of the second terminal;

determining, according to at least one of first attribute information of the first terminal or first attribute information of the second terminal, whether the first terminal and the second terminal belong to a same account when the second attribute information of the first terminal matches the second attribute information of the second terminal;

acquiring first synchronization data of the first terminal according to the second attribute information of the first terminal and the second attribute information of the second terminal when the second attribute information of the first terminal matches the second attribute information of the second terminal and when the first terminal and the second terminal belong to a same account, wherein the first synchronization data are at least one of common data or personalized data; and synchronizing, by the first terminal, the first synchronization data to the second terminal when the second attribute information of the first terminal matches the second attribute information of the second terminal and when the first terminal and the second terminal belong to a same account.

8. The method according to claim 7, further comprising:
acquiring second synchronization data of the first terminal according to the second attribute information of the first terminal and the second attribute information of the second terminal when the second attribute information of the first terminal matches the second attribute information of the second terminal and when the first terminal and the second terminal belong to different accounts, wherein the second synchronization data comprise only common data; and synchronizing, by the first terminal, the second synchronization data to the second terminal when the second attribute information of the first terminal matches the second attribute information of the second terminal and when the first terminal and the second terminal belong to different accounts.

9. The method according to claim 8, further comprising:
acquiring second synchronization data of the first terminal according to the second attribute information of the first terminal and the second attribute information of the second terminal when the second attribute information of the first terminal does not match the second attribute information of the second terminal; and synchronizing, by the first terminal, the second synchronization data to the second terminal when the second attribute information of the first terminal does not match the second attribute information of the second terminal.

10. The method according to claim 7, wherein determining, whether the first terminal and the second terminal belong to a same account comprises:
determining, according to at least one of status information of the first terminal or status information of the second terminal, a duration for establishing the connection;

determining that the first terminal and the second terminal belong to the same account when the duration is greater than or equal to a preset threshold; and determining that the first terminal and the second terminal belong to different accounts when the duration is less than the preset threshold.

11. The method according to claim 7, wherein determining whether the first terminal and the second terminal belong to a same account comprises:
determining whether first account information of the first terminal is the same as second account information of the second terminal;

determining that the first terminal and the second terminal belong to the same account when the first account information is the same as the second account information; and determining that the first terminal and the second terminal belong to different accounts when the first account information is different from the second account information.

12. The method according to claim 7, wherein synchronizing the first synchronization data comprises:
determining, according to first status information of the first terminal, whether the first terminal is being charged;

synchronizing, by the first terminal, the first synchronization data of the first terminal to the second terminal;

executing, by the second terminal, an operation corresponding to first common data of the first terminal when the first terminal is not being charged; and executing, by at least one of the first terminal or the second terminal, an operation corresponding to the first common data when the first terminal is not being charged.

13. The method according to claim 7, wherein synchronizing the first synchronization data comprises:
determining, according to first status information of the first terminal, whether a current battery level of the first terminal is less than a preset threshold;

synchronizing, by the first terminal, the first synchronization data of the first terminal to the second terminal;

executing, by the second terminal, an operation corresponding to first common data of the first terminal when the current battery level is less than the preset threshold; and executing, by at least one of the first terminal or the second terminal, an operation corresponding to the first common data of the first terminal when the current battery level is not less than the preset threshold.

14. A first terminal comprising:
a transceiver configured to establish a connection with a second terminal;

a processor coupled to the transceiver and configured to:
acquire attribute information of the first terminal and the second terminal, wherein the attribute information of the first terminal and the attribute information of the second terminal both comprise first attribute information and second attribute information, wherein the first attribute information includes at least one of account information or status information, and wherein the second attribute information includes at least one of capability information or type information;

determine, according to at least one of the first attribute information of the first terminal or the first attribute information of the second terminal, whether the first terminal and the second terminal belong to a same account; and acquire first synchronization data of the first terminal according to second attribute information of the first terminal and second attribute information of the second terminal when the first terminal and the second terminal belong to a same account, wherein the transceiver is further configured to send the first synchronization data to the second terminal, wherein the processor is further configured to acquire second synchronization data of the first terminal according to the second attribute information of the terminal and the second attribute information of the second terminal when the first terminal and the second terminal belong to different accounts, wherein the second synchronization data include only common data; and wherein the transceiver is further configured to send the second synchronization data to the second terminal.

15. The terminal according to claim 14, wherein the processor is further configured to:

determine, according to at least one of the status information of the terminal or the status information of the another terminal, a duration for establishing the connection;

determine that the first terminal and the second terminal belong to the same account when the duration is greater than or equal to a preset threshold; and determine that the first terminal and the second terminal do not belong to the same account when the duration is less than the preset threshold.

16. The terminal according to claim 14, wherein the processor is further configured to:

determine whether first account information of the first terminal is the same as second account information of the second terminal;

determine that the first terminal and the second terminal belong to the same account when the first account information is the same as the second account information; and determine that the first terminal and the second terminal do not belong to the same account when the first account information is different from the second account information.

17. The terminal according to claim 14, wherein the processor is further configured to:

determine, according to first status information of the first terminal, whether the first terminal is being charged;

instruct the transceiver to send the first synchronization data to the second terminal without performing an operation corresponding to the common data when the first terminal is being charged; and instruct the transceiver to send the first synchronization data to the second terminal and perform an operation corresponding to the common data when the first terminal is not being charged.

18. The terminal according to claim 14, wherein the processor is further configured to:

determine, according to first status information of the first terminal, whether a current battery level of the first terminal is less than a preset threshold;

instruct the transceiver to send the first synchronization data to the second terminal without performing an operation corresponding to the common data when the current battery level is less than the preset threshold; and instruct the transceiver to send the first synchronization data to the second terminal and perform an operation corresponding to the common data when the current battery level is not less than the preset threshold.

* * * * *